United States Patent Office 2,890,689
Patented June 16, 1959

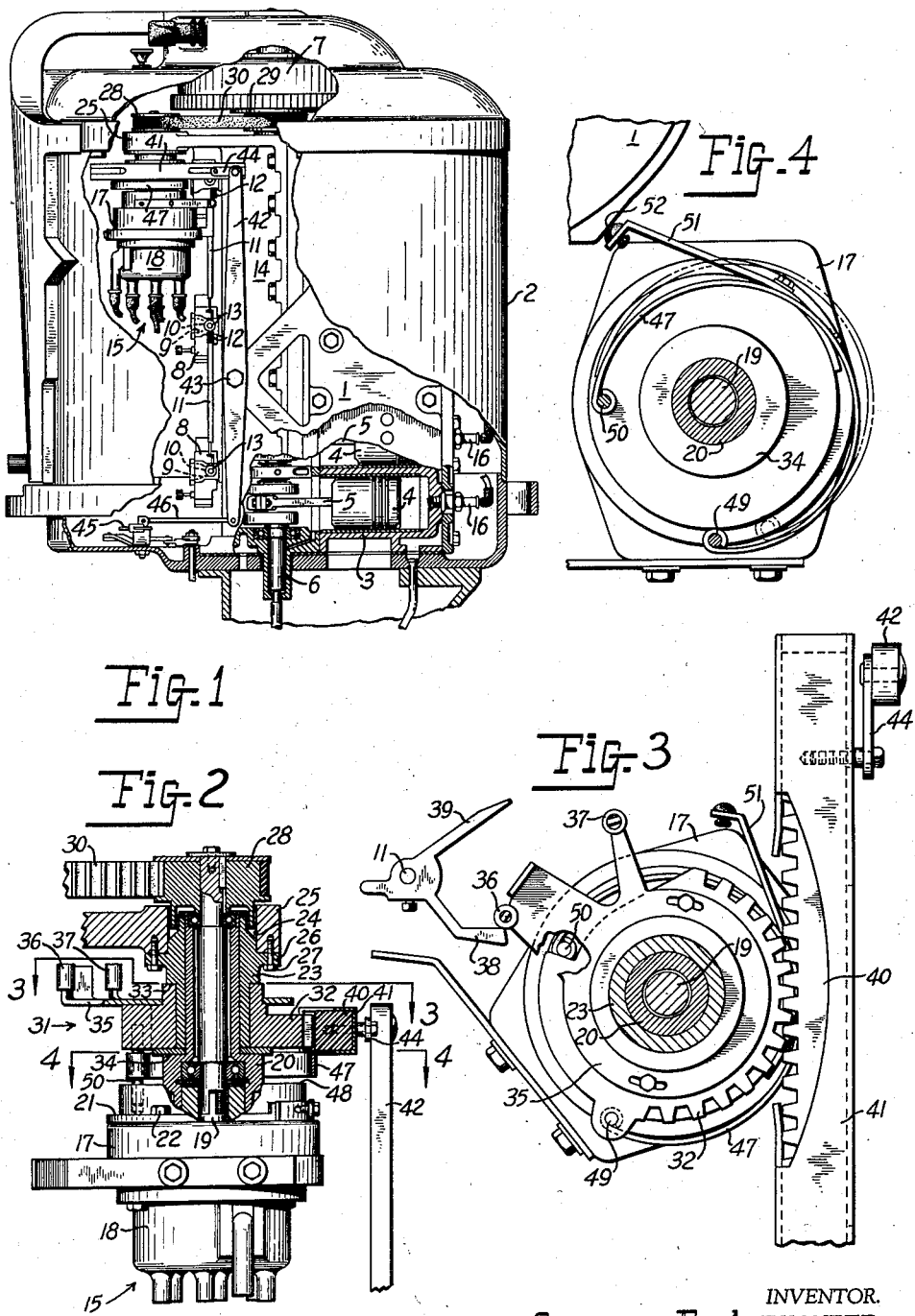

2,890,689

THROTTLE AND IGNITION CONTROL FOR INTERNAL COMBUSTION ENGINES

Charles F. Alexander, Oshkosh, Wis., assignor to Kiekhaefer Corporation, Cedarburg, Wis., a corporation of Wisconsin Application April 22, 1957, Serial No. 654,209

2 Claims. (Cl. 123—98)

This invention relates to internal combustion engines and particularly to means for adjusting the throttle and spark advance and retard to control operation of the engine.

Spark advance and retard in relation to throttle position can substantially influence the efficiency and economy of engine operation. For this reason, engines are usually provided with means for controlling the spark advance and retard in relation to the throttle setting. Generally, however, the prior art adjustment means provide for proportionate adjustment of throttle and spark settings over the full range of engine speed. While a proportionate adjustment of throttle and spark settings over the full range of engine speed may be desirable for engines having certain characteristics, it is uneconomical for engines having other or different characteristics. It is an object of this invention to provide a means for simultaneous adjustment of throttle and spark positions for an engine where proportionate adjustment over the full range of speed would be uneconomical and inefficient.

According to this invention, the engine is provided with control means providing simultaneous and proportionate adjustment of throttle and spark settings over the range of slower engine speeds and a constant spark setting for throttle adjustments over the range of higher engine speeds to enhance the efficiency and economy of the engine over its entire range of speed.

In carrying out the invention, the engine having a carburetor is provided with control means for adjusting the carburetor throttle valve over the range of engine speed. The ignition system for the engine includes a timer unit providing spark ignition in timed relation with engine operation. The timer unit includes a stator and a rotor with the stator being rotatable with respect to the rotor axis to advance and retard spark timing. A relatively rigid spring members interconnects the carburetor control means and the stator of the ignition timer unit and provides for simultaneous and proportionate adjustment of the throttle valve and spark advance upon operation of the control means over the slower range of engine speed. The spring member is adapted to expand and provides lost motion between the carburetor control means and the ignition stator after interruption of the stator to provide a constant spark advance setting upon operation of the control means over the range of higher engine speeds.

The drawings furnished herewith illustrate the best mode of carrying out the invention as presently contemplated and set forth hereinafter.

In the drawings:

Figure 1 is a side elevation of an engine partially in section showing the throttle and ignition control mechanism of this invention;

Fig. 2 is an enlarged fragmentary front elevation of the throttle and ignition control mechanism;

Fig. 3 is an enlarged section taken on line 3—3 of Fig. 2; and

Fig. 4 is an enlarged section taken on line 4—4 of Fig. 2 and additionally includes a portion of the engine block and shows the means for maintaining a constant spark advance setting over the range of higher engine speeds.

The internal combustion engine 1 shown in the drawings is enclosed within a cowl 2 and includes the usual cylinders 3 having pistons 4 and connecting rods 5 between the pistons and the crankshaft 6. The engine 1 is shown as disposed to place the crankshaft 6 in a vertical position and has a flywheel 7 carried at the upper end of the crankshaft.

A suitable fuel mixture is supplied to the engine 1 by carburetor 8 through the intake passage 9. A throttle valve 10 carried on shaft 11 is disposed in passage 9 and controls the supply of fuel to the engine. The coil spring 12 mounted between shaft 11 and the bearing support 13 for the shaft serves to bias the valve 10 to a closed or idling position. The engine illustrated is of the two-cycle type wherein the fuel flows through passage 9 to the crankcase 14 enclosing the crankshaft 6. Suitable transfer ports, not shown, supply the fuel from the crankcase 14 to the cylinders 3.

The ignition for the engine is supplied by means of a battery and coil, not shown, through the distributor 15 to the spark plugs 16 for the respective cylinders 3.

The distributor 15 includes a housing 17 and removable cover 18 which carry the distributor stator elements, not shown. The rotor shaft 19 carrying the usual rotor elements, not shown, is rotatably mounted within housing 17 providing for relative movement therebetween. The rotor shaft 19 is disposed vertically and extends upwardly within the bushing member 20 provided with a lower annular flange 21 to which the distributor housing 17 is secured by bolts 22 as shown. Bushing member 20 is supported and rotatably disposed within a cylindrical support member 23 which extends upwardly through an opening 24 provided in flange 25 cast integrally to the engine block. An annular flange 26 spaced from the end of support member 23 is adapted to engage the undersurface of flange 25 and is secured thereto by bolts 27 to support the distributor 15 by the engine.

A pinion gear 28 is carried at the upper end of the rotor shaft 19 above engine flange 25 and in horizontal alignment with gear 29 carried by the crankshaft 6. A flexible toothed belt 30 extends around gears 28 and 29 in driving relation thereto and assures that the rotor shaft 19 is driven in timed relation with the engine 1.

According to this invention, the control means 31 for adjusting the throttle valve 10 and the advance of the distributor 15 includes a rotatable gear segment 32 rotatably mounted on cylindrical housing 23 between the shoulders 33 and 34 provided respectively on the housing 23 and bushing 20. The gear segment 32 carries a plate member 35 provided with projecting members 36 and 37 for engaging levers 38 and 39 on the throttle valve shaft 11. Upon rotation of gear segment 32 of control means 31 about the rotor shaft 19, shaft 11 is rotated against the bias of spring 12 to open valve 10 correspondingly. Upon counter-rotation of segment 32, the projecting members 36 and 37 are engaged by levers 38 and 39 and serve to control the valve position as the shaft 11 is biased by spring 12 to effect closure of valve 10.

As shown in the drawings, the gear segment 32 is actuated by a rack 40 slidably supported within slide bracket 41 mounted on the engine 1. Rack 40 in turn is actuated by a lever 42 pivotally mounted on the engine at 43. A linkage member 44 between lever 42 and rack 40 translates the arcuate lever movement to the linear rack movement. An actuating lever 45 extends outwardly of the cowl 2 and is connected to the end of lever 42 opposite from rack 40 by means of connecting link 46.

The actuating lever 45 may be operated manually or by means of a remote control mechanism, not shown, to control the throttle valve 10.

Control means 31 includes a relatively stiff arcuate spring member 47 disposed circumferentially and in spaced relation about the bushing member 20 between the gear segment 32 and the shoulder 48 on bushing member 20 to provide a drive connection therebetween with provision for lost motion, whereby the maximum spark advance occurs prior to the maximum throttle opening. One end of the spring member 47 is mounted on the downwardly extending pin member 49 carried by the gear segment 32 and the other end thereof is mounted on the upwardly extending pin member 50 carried by shoulder 48 on bushing member 20. Rotation of the gear segment 32 to control the throttle valve 10 effects rotation of the distributor housing 17 through the spring member 47 to provide a corresponding spark advance for the engine 1.

Prior to the assembly of the spring member 47 onto the control means 31, the spring member forms a nearly closed loop. As the ends of the spring member 47 are moved apart for assembly onto the pin members 49 and 50, a preload is imparted to the spring which acts through the spring lever arm extending between the axis of shaft 19 and a line connecting the axes of pin members 49 and 50. The torque resulting from this preload is opposed by stop means, not shown, between the gear segment 32 and bushing member 20 to maintain the minimum spacing between pins 49 and 50, as shown in Fig. 4. In the course of operation of the control means 31, the spring member 47 may be expanded to the position shown by dot-dash lines in Fig. 4. As the pin member 49 is moved from its position, as shown in Fig. 4, to its phantom position, the load imparted by the spring member 47 increases as the spring member is expanded. While the spring load increases as the spring member 47 is expanded, it will be noted that the spring lever arm is correspondingly decreased. As a result, the torque imposed by the spring member 47 remains substantially constant as the spring member is expanded and there is no appreciable increase of resistance in the operation of control means 31 during the spring expansion.

The characteristics of the engine 1, illustrated in the drawings, are such as to require a spark advance proportionate to the throttle valve positions only for the lower range of engine speeds. In the range of higher engine speeds efficiency and fuel economy for engine 1 are enhanced by maintaining a constant spark position relative to the piston in the engine cylinder. A stop projection 51 is carried by the distributor housing 17 and is adapted to engage the engine 1 at 52 to arrest the rotation of the distributor housing corresponding to the end of the range of lower engine speeds. As the throttle valve 10 is further opened by the control means 31 to attain higher engine speeds, the spring member 47 expands, as shown by the dot-dash lines in Fig. 4, to provide lost motion between the gear segment 32 and the distributor housing 17 to maintain the constant spark advance.

Thus, as the control means 31 of engine 1 is operated through the range of lower engine speeds, the invention provides a spark advance proportionate to the throttle valve positions. Through the range of higher engine speeds the spark advance setting is maintained constant as the control means 31 are actuated to provide corresponding throttle valve positions. Throttle valve and spark advance adjustments are provided for engine 1, therefore, which enhance the efficiency and fuel economy of the engine over its entire range of speeds.

Various modes of carrying out the invention are contemplated as being within the scope of the following claims particularly pointing out and distinctly claiming the subject matter which is regarded as the invention.

I claim:

1. In an internal-combustion engine, a carburetor having an adjustable throttle valve to control the flow of fuel to the engine, an electrical ignition system for the engine and including a timer unit comprising a stator and a rotor, said rotor being rotatable with respect to the stator in timed relation with the operation of the engine and said stator being rotatable with respect to the rotor axis to provide advance and retard adjustment of the timer unit, a rotatable control member mounted freely on said rotor shaft and adapted to adjust the carburetor valve over the entire range of engine speeds, means to rotate the control member, a relatively stiff arcuate spring member disposed circumferentially about the rotor shaft and having one end thereof secured with respect to the control member and the other end secured with respect to the stator to provide for simultaneous advance and retard adjustment of the timer unit upon rotation of the control member over the range of slower engine speeds, and means to interrupt the rotation of the stator at the end of the range of slower engine speeds, whereupon the spring member yields to provide lost motion between the control member and the stator to accommodate continuing rotation of the control member to adjust the carburetor valve over the range of higher engine speeds.

2. The combination set forth in claim 1 wherein the arcuate spring is mounted between the control member and the stator in a preloaded condition, said preload acting through an effective spring lever arm extending radially from the axis of the rotor shaft and normal to a line connecting the ends of said spring to provide a given torque resistance between the control member and stator after interruption of stator rotation, continued rotation of the control member relative to the interrupted stator effecting yielding expansion of the spring to increase the spring load and simultaneously moving the control member spring end connection to correspondingly decrease the length of the effective spring lever arm whereby a relatively constant torque resistance is maintained between the control member and stator during the period of spring expansion.

References Cited in the file of this patent

UNITED STATES PATENTS

| | | |
|---|---|---|
| 1,611,054 | Mayoral | Dec. 14, 1926 |
| 1,766,867 | Woolson | June 24, 1930 |
| 2,069,931 | Trott | Feb. 9, 1937 |
| 2,094,860 | Timar et al. | Oct. 5, 1937 |
| 2,103,348 | Boyce | Dec. 28, 1937 |

FOREIGN PATENTS

| | | |
|---|---|---|
| 787,262 | France | Sept. 19, 1935 |